(12) United States Patent
Ormond et al.

(10) Patent No.: US 10,021,266 B2
(45) Date of Patent: Jul. 10, 2018

(54) SYSTEM AND METHOD FOR AUTOMATED DOCUMENT TRANSLATION DURING TRANSMISSION

(71) Applicants: Kabushiki Kaisha Toshiba, Minato-ku (JP); Toshiba TEC Kabushiki Kaisha, Shinagawa-ku (JP)

(72) Inventors: Louis M. Ormond, Irvine, CA (US); Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/241,343

(22) Filed: Aug. 19, 2016

(65) Prior Publication Data
US 2018/0054543 A1 Feb. 22, 2018

(51) Int. Cl.
| | |
|---|---|
| H04N 1/04 | (2006.01) |
| H04N 1/32 | (2006.01) |
| G06F 17/28 | (2006.01) |
| G06K 9/00 | (2006.01) |
| H04N 1/00 | (2006.01) |

(52) U.S. Cl.
CPC ....... *H04N 1/32106* (2013.01); *G06F 17/289* (2013.01); *G06F 17/2809* (2013.01); *G06K 9/00442* (2013.01); *H04N 1/00411* (2013.01); *H04N 1/32037* (2013.01)

(58) Field of Classification Search
CPC .......... H04N 1/32106; H04N 1/32037; H04N 1/00411
USPC .......................................... 358/1.15, 1, 14, 9
See application file for complete search history.

(56) References Cited

U.S. PATENT DOCUMENTS

| | | | | |
|---|---|---|---|---|
| 9,483,466 | B2 * | 11/2016 | Tang | G06F 17/289 |
| 2012/0069131 | A1 * | 3/2012 | Abelow | G06Q 10/067 |
| | | | | 348/14.01 |
| 2013/0124987 | A1 * | 5/2013 | Lakritz | G06F 17/289 |
| | | | | 715/264 |
| 2017/0054865 | A1 * | 2/2017 | Min | H04N 1/00949 |

* cited by examiner

*Primary Examiner* — Houshang Safaipour
(74) *Attorney, Agent, or Firm* — Ulmer & Berne LLP (57) ABSTRACT

A system and method for document translation during transmission includes digital device, such as a multifunction peripheral, that includes an input for electronic document data, such as with a scanner or facsimile machine input interface. A user interface receives destination address data corresponding to a plurality of document delivery destinations as specified by a user. A memory stores language selection data for each of the plurality of document delivery destinations, as well as web service address information corresponding to at least one cloud-based document processing service including a document translation service. A processor communicates document output data, corresponding to the electronic document, and the language selection data to the at least one document translation service via a network interface, and the translated document is sent to one or more destinations as specified by the destination address data.

16 Claims, 6 Drawing Sheets

SYSTEM AND METHOD FOR AUTOMATED DOCUMENT TRANSLATION DURING TRANSMISSION

TECHNICAL FIELD

This application relates generally to automated document translation and distribution. The application relates more particularly to a system and method for automated scanning, translation and distribution of paper documents to destinations worldwide.

BACKGROUND

Scanners and fax machines provide a means to send electronic copies of tangible documents, such as paper documents, to others. Document processing devices include printers, facsimile machines, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise scanners in combination with other of the afore-noted functions. It is further understood that any suitable document processing device can be used.

Document processing devices, such as MFPs, are frequently shared or monitored by users or technicians via a data network. MFPs, while moveable, are generally maintained in a fixed location. Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially. If a user wishes to scan, fax or copy a paper document, a user will also typically need to walk to the selected device to initiate the process.

Today, documents may readily be sent or exchanged worldwide. Many businesses have locations or employees in different countries. Also, many unrelated companies may do business across their borders. While there may be a common language that may be used for communications, users typically prefer to communicate in their own language. Communication in one's own language allows for faster and more accurate dissemination of information.

If a user wishes to share a document, such as one in their native language, they may choose to send their original version and make it incumbent on the recipient to secure a translation. A user may, in certain instances, have document translated before sending. This can place a substantial burden on the sender, particularly in situations when they are sending the document to multiple users versed in many different languages. With multiple language destinations, a sender will not be inclined to undertake multiple translations, coupled with multiple distributions of these translations, thus placing the burden on each recipient to translate the received document.

SUMMARY

In accordance with an example embodiment of the subject application, a system and method for document translation during transmission includes digital device, such as an MPF, that includes an input for electronic document data, such as with a scanner or facsimile machine input interface. A user interface receives destination address data corresponding to a plurality of document delivery destinations as specified by a user. A memory stores language selection data for each of the plurality of document delivery destinations, as well as web service address information corresponding to at least one cloud-based document processing service including a document translation service. A processor communicates document output data, corresponding to the electronic document, and the language selection data to the at least one document translation service via the network interface, and the translated document is sent to one or more destinations as specified by the destination address data.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When a user has a document that they wish to share, such as a paper document, they may fax it directly to one or more destinations. In earlier facsimile systems, a paper copy of the transmitted document would be automatically generated on the recipient's device following transmission. More recently, systems may relay electronic copies of incoming faxes to recipients. Electronic copies are typically in standardized electronic document forms, such as in Portable Document Format (PDF) or Tagged Information File Format (TIFF). Electronic copies of messages can readily be printed by recipients as desired. Senders may also scan a paper document and send it as an e-mail attachment to one or more destinations. In these situations, the document that is sent mirrors the original.

A user may, to accommodate a foreign language recipient, have a document translated before sending. When the document is to be sent to many users fluent in different languages, the sender will often just send a copy of the original document and leave it to each recipient to translate for themselves. Certain recipients may not wish to be bothered seeking a translation and may simply ignore the document, frustrating the sender's purpose. This can be problematic, particularly in situations such as when the contents of the document are important, or even critical. If each recipient undertakes their own translation, it is an inconvenience and delay for them. There may also be significant wasted effort or cost when multiple recipients share a common language and each undertakes their own translation. Also, recipients may employ different translation resources that could result in translations having differing meaning, even among recipients who share a common language.

Traditionally, translations are completed by humans. More recently, machine translations have been used. Early machine translations were generally crude, particularly when documents were lengthy or complex. Machine translation continues to improve with each new generation of systems. Newer developments may include artificial intelligence to allow for accommodation and translation of idioms or contexts to be true to intended meanings irrespective of literal translations of words or phrases.

The Internet provides resources for both machine and human translation. Certain translation sites may be free, subsided by advertising or by hopes of luring customers into superior, fee based offerings. By way of further example, a site may provide crude, machine translation for free. Improved machine translation may be offered for a fee. Optional fee levels may provide for human verification or actual human translation.

Current web based or cloud service based translations may employ an interface, such as a web portal, wherein a user can directly enter relatively short words, phrases or paragraphs for translation. Uploading of documents for translation may be accomplished for a fee. Uploading may be accomplished with any suitable file transfer mechanism. A commonly used Internet transfer mechanism is via File Transfer Protocol (FTP). In certain instances, a business may subscribe to a subscription for translations for its employees.

Figure 1:
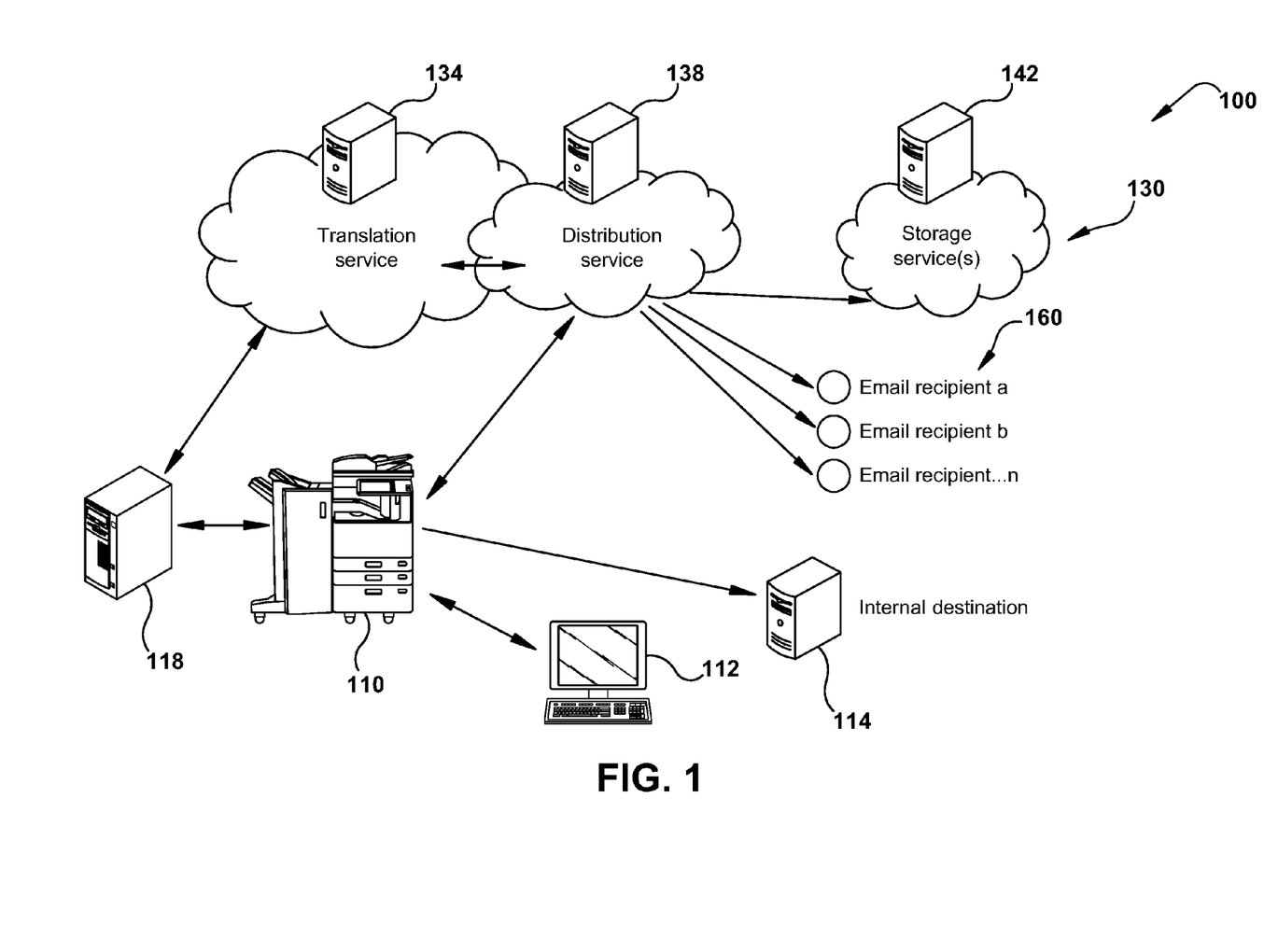
FIG. 1 an example embodiment of a document translation and distribution system.

In accordance with the subject application, FIG. 1 illustrates an example embodiment of a document translation and distribution system 100. If a user wishes to send a document to recipients in two or more languages, the user supplies the document to an MFP, such as MFP 110. This is suitably done by the user approaching the MFP and scanning in one or more paper documents. Alternatively, document data may be comprised of any electronic file, such as an image file or text based file. Electronic documents may also suitably be communicated to MFP 110 as a gateway from user devices, such as workstation 112. Image files are subject to optical character recognition (OCR) to facilitate translation. As will be described further below, such OCR translation is suitably accomplished on MFP 110, or alternatively via a web service. An electronic document may be held on a local storage of MFP 110, or alternatively directed to an internal destination, such as a local storage at server 114.

In the example embodiment of FIG. 1, a user also inputs one or more destination addresses, such as a destination e-mail address or destination fax number. An example user interface to accomplish this will be detailed further below. The user suitably supplies a language associated with this destination. Alternatively, a suggested language may be derived from the destination address. For example, a top level domain may indicate a country, such as .DE for Germany, .JP for Japan. Other top level domain names might be ambiguous. Also, the existence of a particular country top level domain does not necessarily mean that the recipient is a native speaker of the associated language. Accordingly, a suggest country subject to user confirmation may be made. Similarly, facsimile numbers may start with a country code leading to an assumption of a target language for translation, but these too are subject to exceptions.

As will be described further below, translation may suitably be accompanied by a fee. By way of further example, rough, machine-based translation may be at no cost. A higher quality translation, or translations to less popular languages, may also result in a cost, or higher cost. In such instances, it may be advantageous to provide a fee quote or estimate for approval by a sender in advance.

Information for suggested translation languages may suitably be from a local database to the MFP 110, or alternatively gleaned from a web based services, such as a domain name server, content provider, domain name registry online information repository, or the like, illustrated by address registry 118.

It would be often impractical to have translation capability on an MFP 110 itself, or using only local resources, other than in instances where very few translations, or translations to a small group of languages is needed. Accordingly, the illustrated example embodiment utilizes cloud-based resources 130, which resources may include a translation service 134, a distribution service 138 or a storage service 142. In the illustrated example, an electronic document, such as that from a scanner associated with MFP 110, is routed to cloud-based distribution service 138 along with address information for targeted recipients of the electronic document. If the electronic document was not previously subject to optical character recognition, it is suitably accomplished by a cloud-based service. The cloud-based service may also provide for selection or suggestion of translation languages, such as by use of address registry 118. Once translation is complete, the associated document is suitably routed to one or more specified destinations, such as to email recipients 160.

Figure 2:
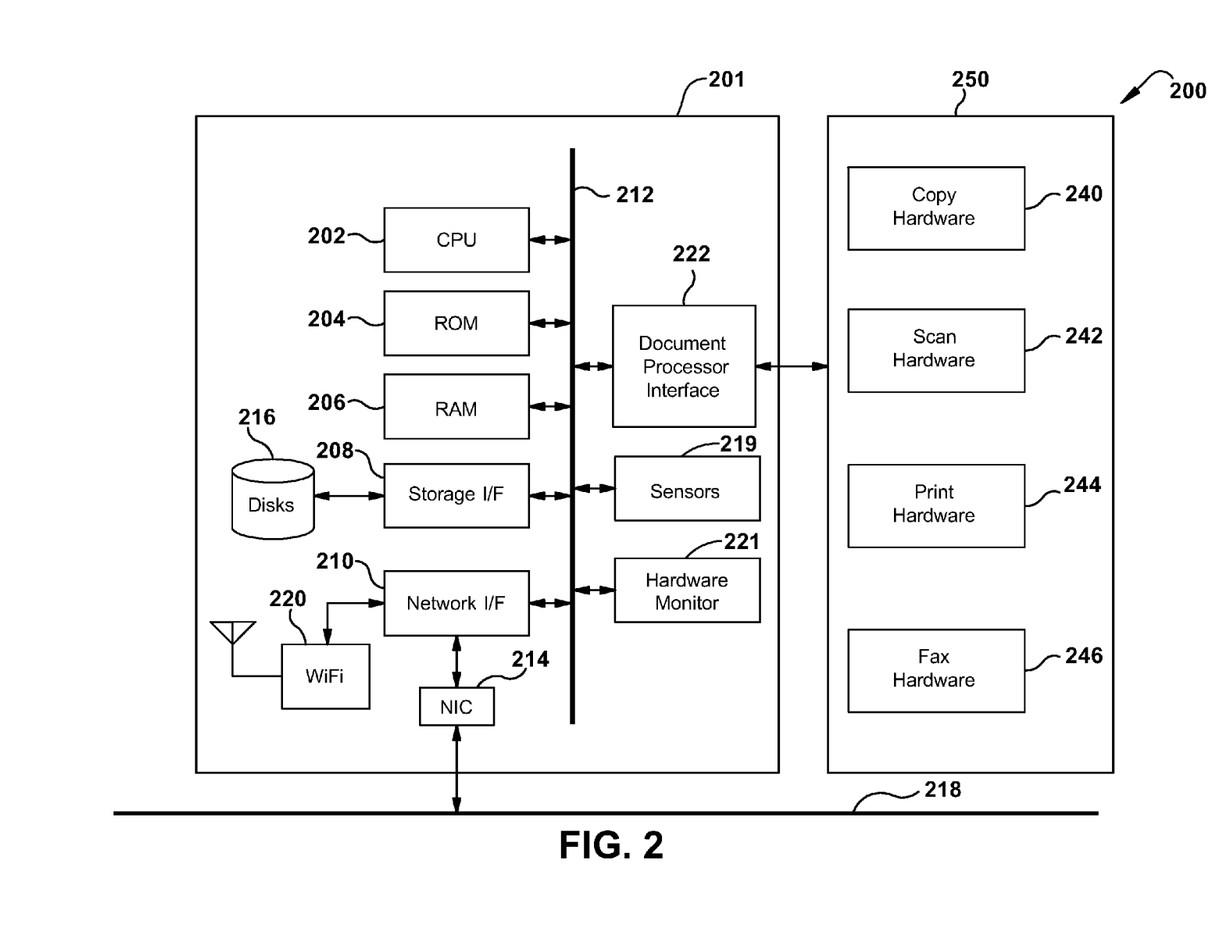
FIG. 2 is an example embodiment of a document rendering system.

Turning now to FIG. 2, illustrated is an example embodiment of a document rendering system 200 suitably comprised within an MFP, such as MFPs 110 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218, or to a wireless data connection via wireless network interface 220. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with one or more sensors 219 which provide data relative to a state of the device or associated surroundings, such as device temperature, ambient temperature, humidity, device movement and the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
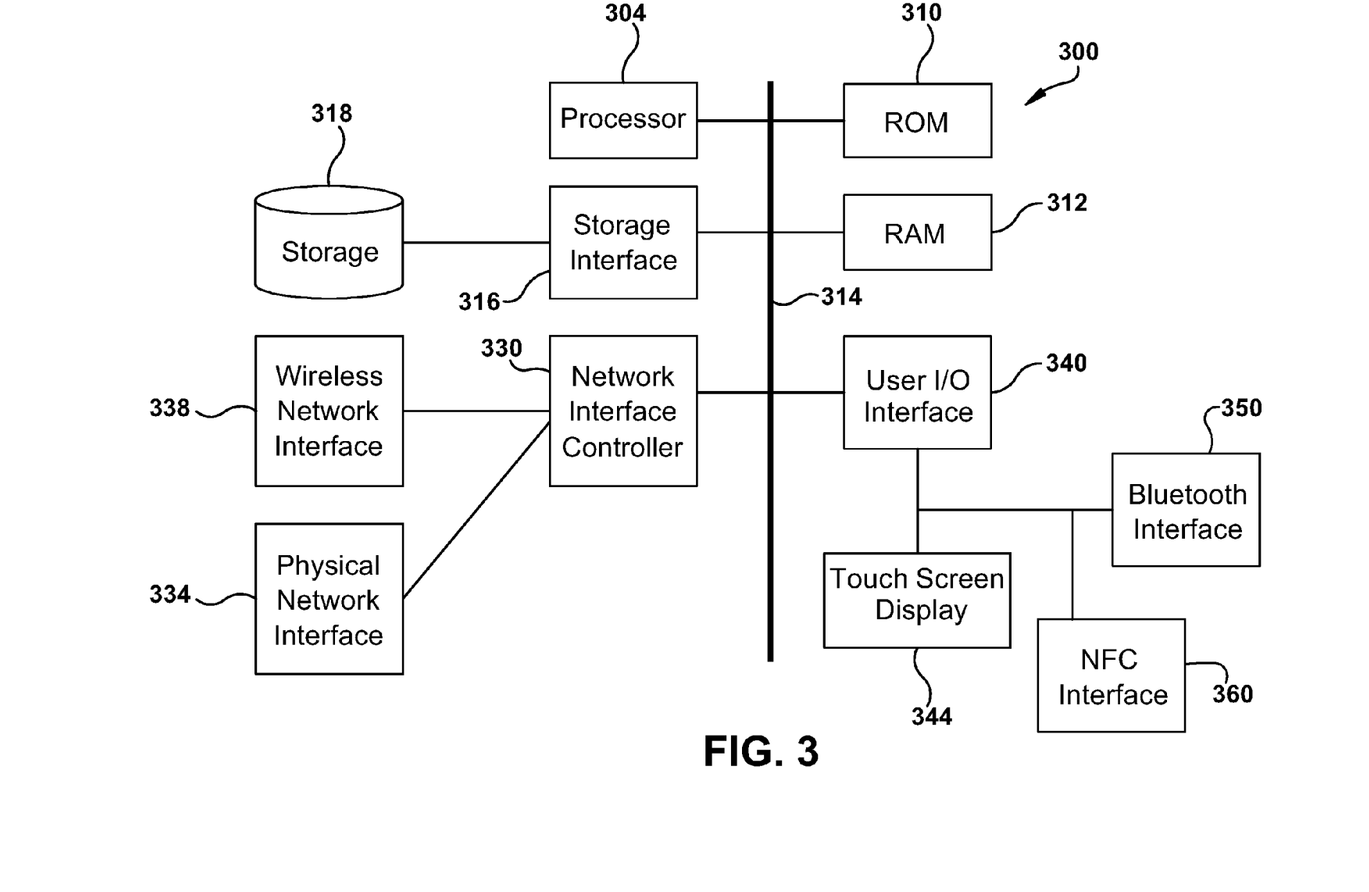
FIG. 3 is an example embodiment of a digital device.

Turning now to FIG. 3, illustrated is an example embodiment of a digital device 300 such as client computer as provided with workstation 112 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above.

Processor 304 is also in data communication with a user input/output (I/O) interface 340 which provides data communication with user peripherals, such as display 344, Bluetooth interface 350, and near-field communication interface 360, as well as keyboards, mice, track balls, touch screen displays 344, or the like. It will be understood that functional units are suitably comprised of intelligent units, including any suitable hardware or software platform.

Figure 4:
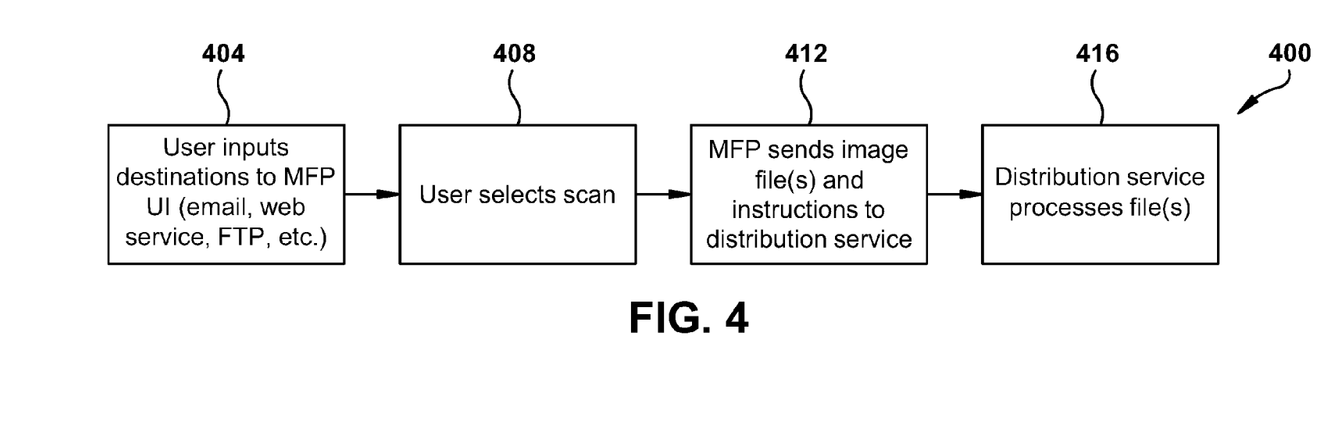
FIG. 4 is a flow diagram of an example embodiment.

Turning now to FIG. 4, illustrated is a flow diagram 400 of an example embodiment of automated processing of document translation and distribution. At block 404, a user inputs destinations into an MFP user interface. Suitable address information may comprise addresses for e-mail, web service, FTP transfer, facsimile number, and the like. A user scans a document at the MFP at block 408, and the scanned image of the document and distribution or translation instructions are sent to a web service at block 412. The web service then completes translations and distributes the translated documents to their destinations at block 416.

Figure 5:
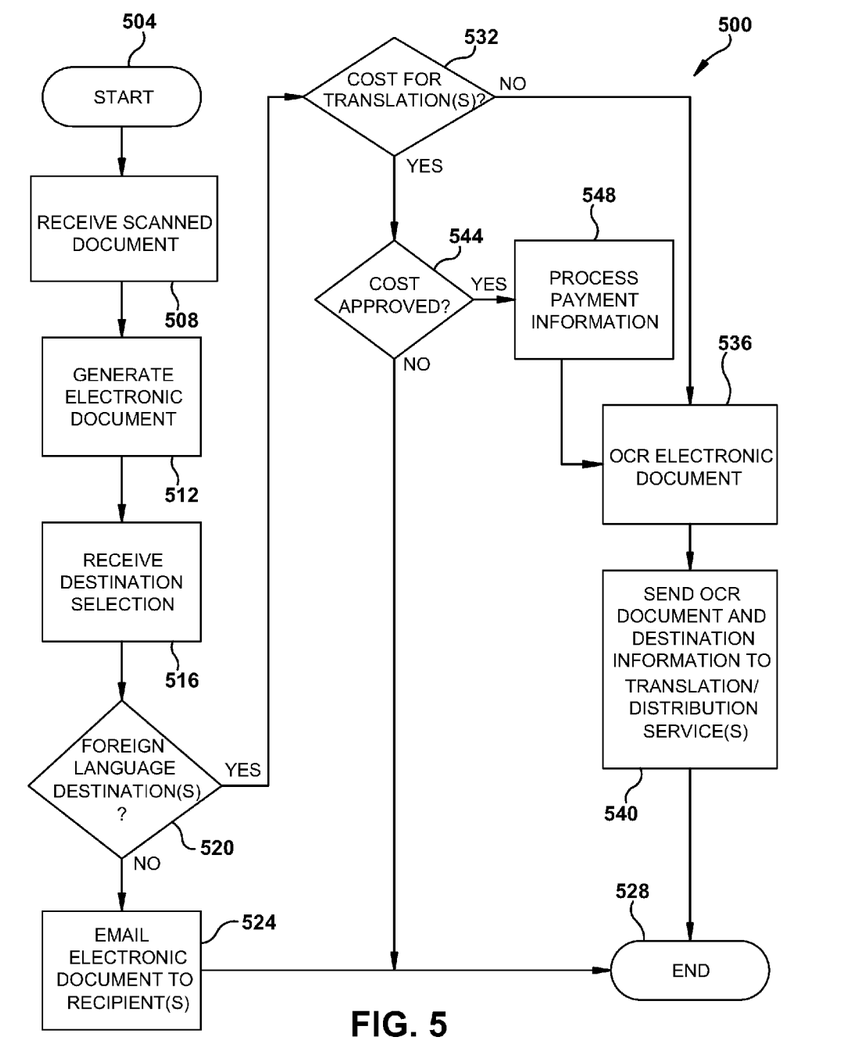
FIG. 5 is a flowchart of an example embodiment.

Turning now to FIG. 5, illustrated is a flowchart 500 of an example embodiment for cloud-based document translation and distribution, such as may be implemented in whole or in part on an MFP controller. The process commences at block 504, and proceeds to block 508 where an electronic document, such as from a scanned tangible document at the MFP, is received. A corresponding electronic document is generated at block 512. One or more target destinations is received, such as via an MFP user interface, at block 516. A determination is made at block 520 as to whether any foreign language destinations are present. If not, an untranslated document is sent to each designated recipient at block 524 and the process ends at block 528.

If it is determined at block 520 that one or more translations are desired, a cost is determined at block 532. If there is no cost, the electronic document may be subjected to optical character recognition at block 536. This step may be skipped in situation where this is accomplished via a web service. The resultant document is then sent to a web service for translation and distribution at block 540.

If a cost is required at block 532, user approval is requested at block 544. If approved, payment information is processed at block 548, and the process proceeds to block 536 as described above. If not, the process ends at block 528. It will be appreciated that the destination selection, language selection or language approval, or cost approval when needed, is suitably accomplished iteratively for multiple destinations or translations.

Figure 6:
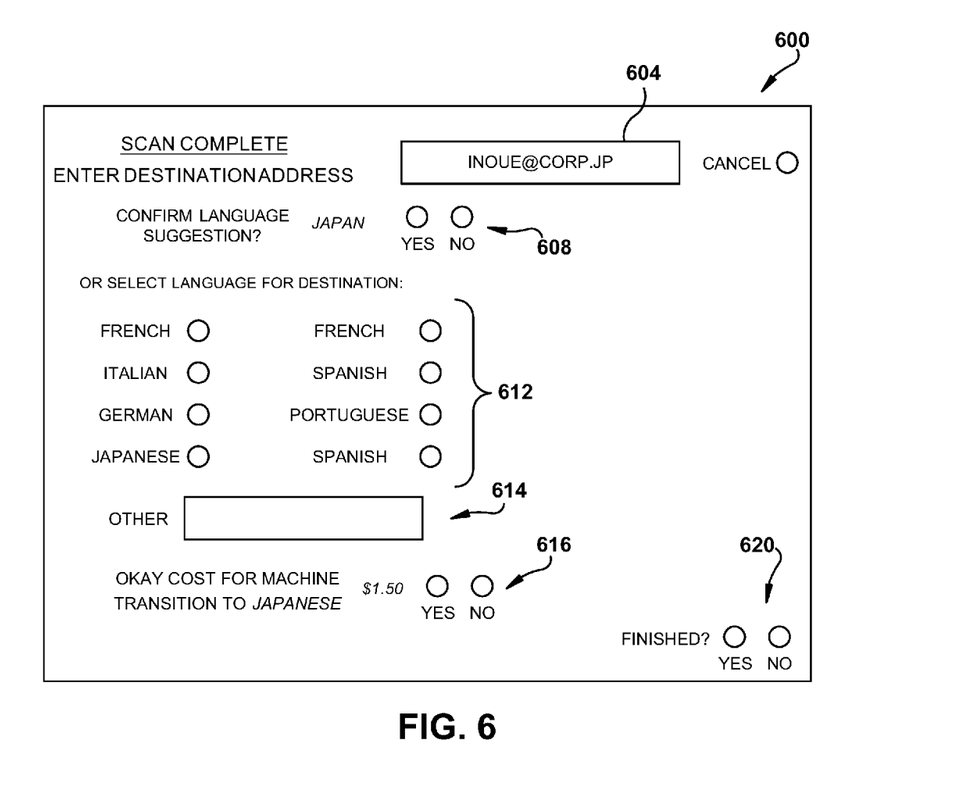
FIG. 6 is an example embodiment of a user interface screen.

Turning next to FIG. 6, illustrated is an example embodiment of a user interface screen 600 suitably generated by an MFP controller and viewable on a MFP touch screen. Once a scan is complete, the user is prompted for an address or facsimile number for input at box 604. This address is suitably analyzed to provide a suggested translation language at 608. Possible languages for conversion are selectable at 612, or other required languages entered at 614. An associated cost is displayed for approval at 616, and additional selections, if needed, can be made at 620.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
A scanner configured to generate electronic document data as an image file corresponding to at least one tangible document,
an input configured to receive the electronic document data;
a network interface;
a destination address input configured to receive destination address data corresponding to a plurality of document delivery destinations;
a processor configured to determine from each destination address a language corresponding to its document delivery destination,
a memory configured to
store language selection data corresponding to each determined destination address for each of the plurality of document delivery destinations, and
store web service address information corresponding to at least one cloud-based document processing service including a document translation service; and
wherein the processor is further configured to communicate document output data, corresponding to the electronic document and the language selection data, to the at least one cloud-based, fee based document processing service via the network interface; and
the processor is further configured to send an instruction to the cloud-based server to distribute translated version of character data in the image file to the plurality of document delivery destinations in accordance with the language selection data.

2. The system of claim 1 wherein the processor is further configured to communicate the destination address data to the at least one cloud-based document processing service further including an electronic document distribution service.

3. The system of claim 2 wherein the processor is further configured derive optical character data from the input electronic document data, and wherein the document output data is comprised of the optical character data.

4. The system of claim 3 wherein the processor is further configured to communicate the document output data to the at least one cloud-based document processing service further including a document repository.

5. The system of claim 1 further comprising wherein the processor is further configured to determining each language from a top level domain or a country code associated with each destination.

6. A method comprising:
scanning at least one tangible document to generate electronic document data as an image file,
receiving the electronic document data;
receiving destination address data corresponding to a plurality of document delivery destinations;
determining a language corresponding to each document delivery destination in accordance with its corresponding destination address;
storing language selection data for each of the plurality of document delivery destinations in a memory;
storing web service address information corresponding to at least one cloud-based document processing service including a document translation service in the memory;
communicating document output data, corresponding to the electronic document and the language selection data, to the at least one cloud-based, fee-based document processing service via a network interface; and
sending an instruction to the cloud-based server to distribute translated versions of character data in the image file to the plurality of document deliver destinations in accordance with the language selection data.

7. The method of claim 6 further comprising communicating the destination address data to the at least one cloud-based document processing service further including an electronic document distribution service.

8. The method of claim 6 further comprising deriving optical character data from the received electronic document data whereas the document output data is comprised of the optical character data.

9. The method of claim 8 further comprising communicating the document output data to the at least one cloud-based document processing service further including a document repository.

10. The method of claim 6 further comprising determining each language from a top level domain or a country code associated with its delivery destination.

11. A system comprising:
a scanner configured to receive at least one tangible document;
a processor configured to generate an image file corresponding to the at least one tangible document;
the processor further configured to receive destination address data corresponding to a plurality of document destinations;
the processor further configured to generate language selection data in accordance with received destination address data;
a memory configured to
store the destination address data corresponding to the plurality of document delivery destinations,
store the language selection data for each of the plurality of document delivery destinations, and
store web service address information corresponding to at least one cloud-based document processing service including a fee based machine document translation service;
a processor configured to communicate document output data, corresponding to the electronic document and the language selection data to the at least one cloud-based document processing service via a network interface; and
the processor further configured to send an instruction to the cloud-based server to distribute translated versions of character data in the image file to the plurality of document delivery destinations.

12. The system of claim 11 wherein the processor is further configured to generate cost estimate data corresponding to the image file and the language selection data, and further comprising:
a display generator configured to generate a user prompt corresponding to the cost estimate data on a display; and
a user interface configured to receive a response to the user prompt, and
wherein the processor is further configured to selectively communicate the document output data and the language selection data in accordance with the received response.

13. The system of claim 11 wherein the processor is further configured to communicate the document output data to the at least one cloud-based document processing service comprised of a file transfer protocol server.

14. The system of claim 11 wherein the processor is further configured generate the language selection data from a top level domain or a country code specified by the destination address data.

15. The system of claim 14 wherein the processor is configured to retrieve key data from a web service content repository, and wherein the processor is further configured to pre-determine the language selection data from the destination address data and the key data.

16. The system of claim 11 further comprising:
a display generator configured to generate a confirmation prompt on a display in accordance with the predetermined selection data; and
a user interface configured to receive a response to the confirmation prompt, and
wherein the processor is further configured to generate the language selection data in accordance with the received response.

* * * * *